United States Patent
Na et al.

(10) Patent No.: US 9,560,271 B2
(45) Date of Patent: Jan. 31, 2017

(54) REMOVING UNWANTED OBJECTS FROM PHOTOGRAPHED IMAGE

(71) Applicant: Samsung Electronics Co., Ltd., Gyeonggi-do (KR)

(72) Inventors: Jinhee Na, Seoul (KR); Kihuk Lee, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 4 days.

(21) Appl. No.: 14/319,667

(22) Filed: Jun. 30, 2014

(65) Prior Publication Data

US 2015/0022698 A1    Jan. 22, 2015

(30) Foreign Application Priority Data

Jul. 16, 2013 (KR) .......................... 10-2013-0083326

(51) Int. Cl.
| | |
|---|---|
| *H04N 5/232* | (2006.01) |
| *H04N 5/262* | (2006.01) |
| *H04N 5/265* | (2006.01) |
| *G06T 5/00* | (2006.01) |

(52) U.S. Cl.
CPC ...... *H04N 5/23229* (2013.01); *H04N 5/23222* (2013.01); *H04N 5/2621* (2013.01); *G06T 5/00* (2013.01); *G09G 2320/106* (2013.01); *H04N 5/23254* (2013.01); *H04N 5/23293* (2013.01); *H04N 5/265* (2013.01); *H04N 5/2625* (2013.01)

(58) Field of Classification Search
None
See application file for complete search history.

(56) References Cited

U.S. PATENT DOCUMENTS

| | | | | |
|---|---|---|---|---|
| 8,411,171 | B2 * | 4/2013 | Kim ................... | G06K 9/00228 348/222.1 |
| 2004/0223649 | A1 * | 11/2004 | Zacks .................... | G06T 11/00 382/218 |
| 2005/0129324 | A1 * | 6/2005 | Lemke .................. | H04N 1/387 382/254 |
| 2009/0324103 | A1 * | 12/2009 | Gelfand ................ | G06T 11/60 382/224 |
| 2010/0302383 | A1 * | 12/2010 | Fuh ..................... | H04N 5/23248 348/208.4 |
| 2011/0103644 | A1 * | 5/2011 | Garten .................. | G06T 5/005 382/103 |
| 2012/0243802 | A1 * | 9/2012 | Fintel .................. | H04N 5/2625 382/284 |
| 2014/0111662 | A1 * | 4/2014 | Mashiah ................ | G06T 13/80 348/220.1 |

* cited by examiner

*Primary Examiner* — Timothy J Henn
*Assistant Examiner* — Quan Pham
(74) *Attorney, Agent, or Firm* — Cha & Reiter, LLC

(57) ABSTRACT

A device and method for processing an image in a device having a camera is disclosed. A motion vector of an unwanted object in preview frames of the desired image is identified. A photographing interval in accordance with the motion vector may be set. Continuous frames of the desired image may be photographed in accordance with the photographing interval. The unwanted object is removed from the desired image.

13 Claims, 13 Drawing Sheets

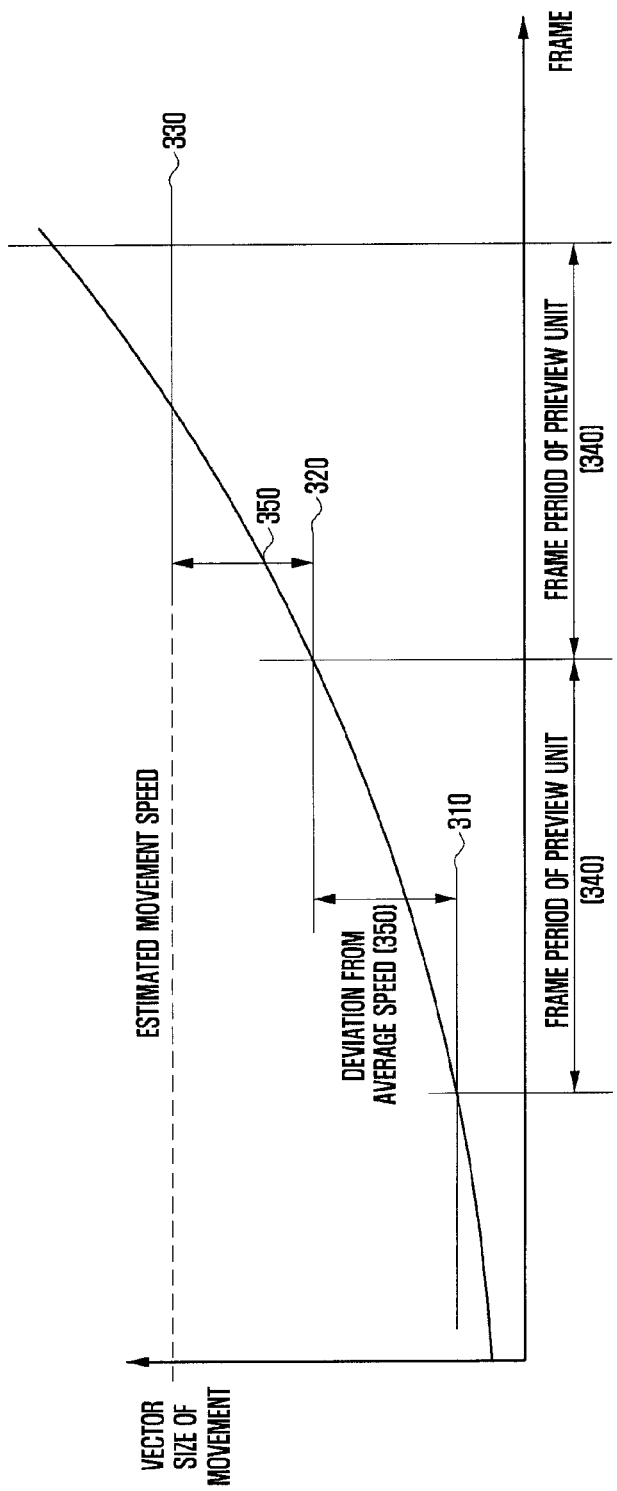

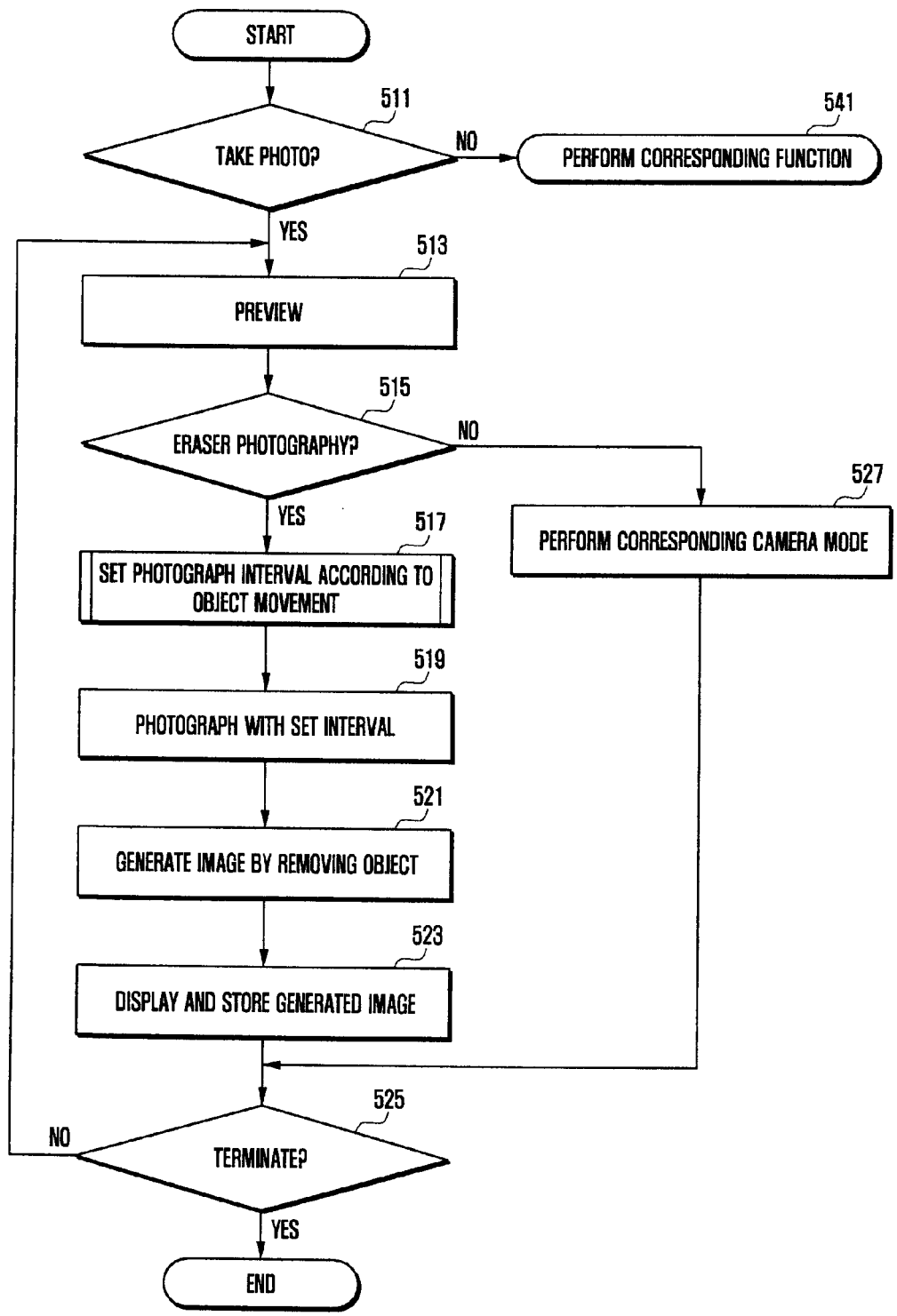

REMOVING UNWANTED OBJECTS FROM PHOTOGRAPHED IMAGE

CLAIM OF PRIORITY

This application claims the benefit under 35 U.S.C. §119(a) of a Korean patent application filed on Jul. 16, 2013 in the Korean Intellectual Property Office and assigned Ser. No. 10-2013-0083326, the entire disclosure of which is hereby incorporated by reference.

TECHNICAL FIELD

The present disclosure relates to an apparatus and method for processing an image in a device having a camera and, more particularly, to an apparatus and method for processing an image including a moving object.

BACKGROUND

When photographing a desired image in a camera device or an electronic device having a camera, an undesired object may be included in the photographed image. For example, when photographing a desired image such as a scene or a building, an undesired moving object, such as a person or a flying object, can be included in the picture while photographing the image. Furthermore, when photographing a portrait, an unwanted moving object, such as a passerby, an animal, or an automobile, may be included in the image.

In this instance, a user may re-photograph the subject to get a desired photo or may remove the undesired object from the photographed image. However, re-photographing the identical subject may be burdensome and may increase the likelihood of photographing the subject in an undesired condition due to a change in the environment. Removing the undesired object may be just as burdensome, since removal of the undesired object may include manually removing the object using a separate image processing program (e.g., Photoshop), and a portion of the desired image (e.g., a background image) may not be perfectly restored.

SUMMARY

In view of the foregoing, aspects of the present disclosure address at least some of the above mentioned problems and/or disadvantages. Accordingly, disclosed herein are an apparatus and method for processing an image in a device having a camera that can edit the image by automatically removing the object.

The camera device or the electronic device having a camera in accordance with aspects of the present disclosure analyzes an object having a movement in a preview image of an eraser photographing mode, sets a photographing time and/or interval in accordance with the result of analysis, continuously photographs images in accordance with the set time interval, and generates an image by removing an object from the photographed image.

In accordance with an aspect of the present disclosure, a method for processing an image in a device having a camera is disclosed. The method may include: identifying a motion vector of an unwanted object in preview frames of a desired image obtained by a camera; setting a photographing interval in accordance with the motion vector; photographing continuous frames of the desired image in accordance with the photographing interval; and removing the unwanted object from the desired image so as to restore a background behind the unwanted object using the continuous frames and the photographing interval.

In accordance with another aspect of the present disclosure, an apparatus for processing an image in a device having a camera is disclosed. The apparatus may include: a camera and a control unit to: identify a motion vector of an unwanted object in preview frames of the desired image obtained by the camera; set a photographing interval in accordance with the motion vector; photograph continuous frames of the desired image with the camera in accordance with the photographing interval; and remove the unwanted object from the desired image so as to restore a background behind the unwanted object with the continuous frames and the photographing interval.

BRIEF DESCRIPTION OF THE DRAWINGS

The above and other aspects, features, and advantages of the techniques herein will be more apparent from the following description taken in conjunction with the accompanying drawings, in which:

FIG. 3 is a drawing illustrating a working example of setting a photographing time in accordance with aspects of the present disclosure;

FIG. 5 is a flow chart illustrating an example method for eraser photographing in accordance with aspects of the present disclosure;

DETAILED DESCRIPTION

Hereinafter, examples of the disclosure are described in detail with reference to the accompanying drawings. The same reference symbols are used throughout the drawings to refer to the same or like parts. Detailed descriptions of well-known functions and structures incorporated herein may be omitted to avoid obscuring the subject matter of the disclosure. A device with a camera may generate an image by removing an undesired object from a photographed image. In one example, the device disclosed herein may extract motion vector of unwanted objects(for example, moving objects) in preview image obtained by the camera;

may set a photographing interval time needed to restore a background image according to removal an unwanted object by analyzing the motion vector; and may continuously photograph frames in accordance with the photographing interval. In a further example, the device may delete moving objects from the continuously photographed frames and may display a desired image via a display unit. In yet a further example, the device may store the desired image in a storage unit by synthesizing frames without the undesired object such that the background image replaces the unwanted objects.

In one example, the electronic device may be a camera device. In a further example, an "unwanted object" may be defined as an object in a photographed image not intended to be part of the photograph, and a "moving object" or "moving unwanted object" may be defined as an unwanted object included in the photographed image that moves. In yet a further example, the term "photographing interval" may be defined as a photographing time which may be used to restore a background image in an area from which the unwanted object is removed. A control unit may continuously photograph frames in accordance with the photographing interval (or period) so that a predetermined number of frames can be obtained. In another example, the photographing mode for removing an unwanted object from a desired image may be defined as an eraser photographing mode.

Figure 1:
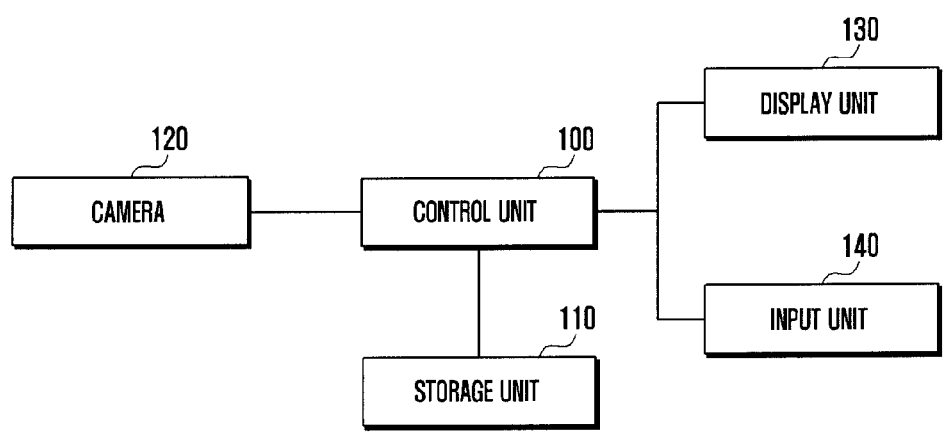
FIG. 1 is a block diagram illustrating a configuration of an example camera device in accordance with aspects of the present disclosure.

FIG. 1 is a block diagram illustrating an example configuration of a camera device in accordance with aspects of the present disclosure. FIG. 1 illustrates a control unit 100 that may generally manage or control the camera device. Furthermore, the control unit 100 may identify motion vectors of moving objects by analyzing preview frames in an eraser photographing mode; set a photographing interval by analyzing the identified motion vectors; continuously photograph an image in accordance with the set photographing interval; may remove unwanted objects from the photographed frames; and, may synthesize a background image at a location from which the unwanted object was removed.

A camera 120 may obtain preview frames under the control of control unit 100, and may continuously photograph frames for a predetermined time in the eraser photographing mode.

A storage unit 110 may include a program memory for storing an operating program and programs in accordance with aspects of the present disclosure, and a data memory for storing photographed images. Furthermore, the storage unit 110 can temporarily store preview frames and continuously photographed preview frames obtained by the camera, and store an image edited by the control unit 100. A display unit 130 may display a desired image photographed under the control of the control unit 100. The display unit 130 may be an LCD or an OLED. The input unit 140 may detect input for controlling the camera device. Here, the display unit 130 and the input unit 140 may be formed in an integrated touch screen.

Using a camera device with the above configuration, a user may set a photographing mode through the input unit 140. The photographing mode may be an eraser photographing mode in accordance with aspects of the present disclosure. The eraser photographing mode may be set when an unwanted moving object is included in an image being photographed.

Figure 2:
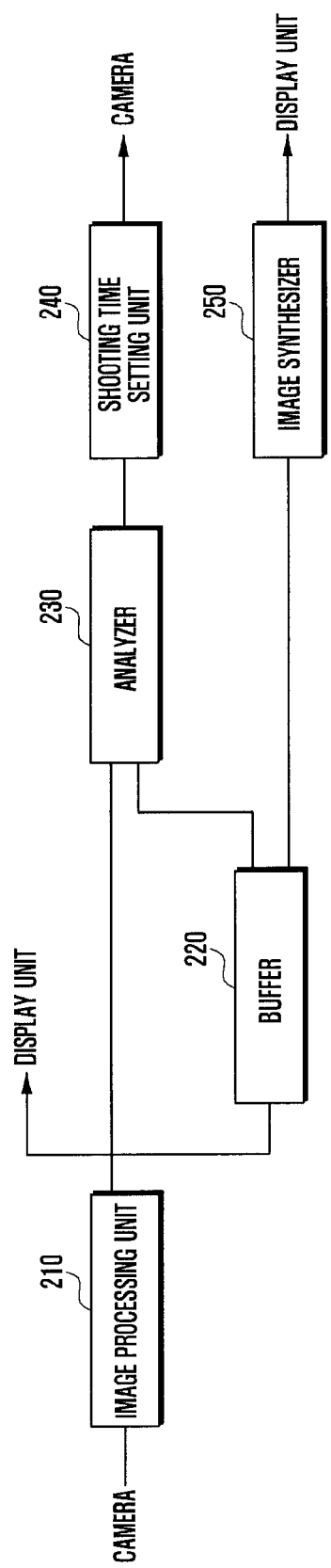
FIG. 2 is a block diagram illustrating a configuration of an example control unit for processing an image in accordance with aspects of the present disclosure.

FIG. 2 is a block diagram illustrating a configuration of an example control unit for processing an image in accordance with aspects of the present disclosure. FIG. 2 shows an image processing unit 210 that may convert an analog image signal generated by camera 120 to a digital image signal. In another example, image processing unit 210 may pre-process and post-process image data. The image processing unit 210 may include an image pre-processor; an image post-processor; a scaler for generating a desired image scaled into a predetermined display size of display unit 130; and/or codec for encoding and compressing image data. In another example, an image from which a moving object may be identified may be an image before scaling (e.g., a raw image or preview frame obtained by the camera 120). A buffer 220 may temporarily store image data processed by the image processing unit 210. Here, the buffer 220 may be provided in the storage unit 110, or as an internal buffer of control unit 100.

An analyzer 230 may identify a moving vector of an unwanted object by tracking a movement of the object in the preview frames. The object may be tracked by comparing and analyzing frames processed by image processing unit 210 in the preview mode and frames previously stored in buffer 220. A shooting time setting unit 240 may set a photographing interval by analyzing a motion vector and an object size identified by the analyzer 230. In accordance with the analyzed movement speeds and sizes of unwanted moving objects included in the image, the shooting time setting unit 240 may set a photographing time. In one example, a photographing time may be defined as a number frames it takes a moving object to move out of the way of a background image, such that the background image completely re-appears.

In a further example, if the photographing time is set as described above, the control unit 100 may continuously photograph frames in accordance with the photographing time. The control unit 100 may generate a continuous photographing signal that causes an image to be photographed in accordance with the set photographing time (e.g., 5 times) in the eraser photographing mode. In another example, if the photographing time is set, the control unit 100 may identify a photographing interval in accordance with the number of photographed frames per second, and may repeatedly generate a photographing control signal in accordance with the photographing interval. The image processing unit 210 may process frames continuously obtained by camera 120, and the buffer 220 may temporarily store the frames processed by the image processing unit 210.

An image synthesizer 250 may remove moving objects in the image by synthesizing the frames stored in the buffer 220. Furthermore, image synthesizer 250 may reproduce the image by synthesizing the background image at the location of the removed object from the preview frames. That is, the image synthesizer 250 may reproduce the image by restoring a background image at the location of the removed object by synthesizing a plurality of preview frames. The control unit 100 may display the desired image generated by image synthesizer 250 in display unit 130, and may store the desired image in storage unit 110.

In one example, control unit 100 may set camera 120 to a preview mode, may process frames photographed by camera 120 using image processing unit 210, and may display the final desired image in display unit 130. In one example, the desired image may be generated by pre-processing and post-processing frames obtained by camera 120 and can be scaled into a size suitable for display in display unit 130. In a further example, if a user generates an eraser photographing signal through input unit 140, the control unit 100 stores the preview frames output by the image processing unit 210 in the buffer 220 while performing the preview mode. The image processing unit 210 may process the frames stored in the buffer 220 until a final full resolution desired image is generated while performing the eraser photographing mode. The buffer 220 may store frames processed by the image processing unit 210 in the preview mode.

The analyzer 230 may analyze movements of objects included in the image by implementing a frame by frame analysis. The following is an example of how analyzer 230 may identify an object moving in an image. Analyzer 230 may compare a frame output by buffer 220 with a subsequent frame output by image processing unit 210. The frames may be taken sequentially in time. When comparing a previous frame with the next frame, the analyzer 230 compares Y-values ("brightness") for each pixel, and identifies pixels that appear to be moving across the frames, when the difference in Y-values between frames is greater than a predetermined value. In one example, the comparison result may be stored for each frame. The analyzer 230 may repeatedly compare a series of frames and classify pixels throughout the frames that have a substantially similar brightness difference. The analyzer 230 may identify a motion vector by connecting pixels having this similar brightness difference. The analyzer 230 may identify a particular object, when similar pixels are connected or located close to each other within a threshold to identify the motion vector.

The analyzer 230 may identify motion vectors for each unwanted object that appear to move between the intermediate frames. The image photographed by camera 120 may not include an unwanted object or may include multiple unwanted objects. If more than one moving unwanted object is included, the analyzer 230 may identify motion vectors for each unwanted object.

Control unit 100 may identify a photographing time and the size of an unwanted object by using the computed motion vector. As noted above, a photographing time may be a number frames it takes a moving object to move out of the way of a background image. That is, the photographing time may be a number of frames consumed by a moving object when moving from an initial location to another location. These frames may be removed so that a background image may be completely restored. If the image includes a plurality of unwanted moving objects, control unit 100 can set the photographing time based on an unwanted object having the slowest speed and the greatest size.

The following are examples for calculating the photographing time. In one example, the control unit 100 may calculate a size of an unwanted object and may calculate a photographing time by comparing the movement and the size of an unwanted object. The shooting time setting unit 240 may identify sizes of each unwanted object as it moves by analyzing the motion vectors of each unwanted object. The shooting time setting unit 240 may divide the size of each object by its motion vector size. The slowest object with the largest result of the foregoing division may be deemed to have the largest value. Time setting unit 240 may use the calculated result of dividing the object size by the motion vector size as a photographing interval. In one example, the photographing interval may be defined as the maximum frames needed to be photographed per second so that a moving unwanted object moves out of the way of a background image. In another example, the photographing time may comprise a number of frames that take longer to photograph than the time required to completely replace the removed object with the background image.

In yet a further example, the photographing time may be set by estimating the movement speed of the object. Referring now to FIG. 3, a working example of setting a photographing time by estimating an object movement is shown. Shooting time setting unit 240 may calculate an average speed by averaging the moving vector sizes output by analyzer 230 for a predetermined frame period. The predetermined frame period 340 may be, for example, 3 to 5 frames. Shooting time setting unit 240 may calculate the average speed by averaging the vectors of moving unwanted objects in each frame output by analyzer 230 for the predetermined frame period, as shown by 310 of FIG. 3. Shooting time setting unit 240 may calculate a change in a motion vector as shown by 320 in the next frame period 340 and may calculate a deviation 350 by calculating a difference from the average value.

The shooting time setting unit 240 may calculate a difference between a given motion vector and the average motion vector value for the predetermined frame period as described above. Based on this difference, shooting time setting unit 240 may calculate an estimated movement speed by estimating an increase or decrease of the movement speed as shown by 330. The method of estimating an increase/decrease of the movement speed may be performed by using a Kalman filter. The shooting time setting unit 240 may identify the estimated movement speed 330 as a motion vector and may calculate the maximum photographing frames per second by dividing the object size by the motion vector size.

In one example, shooting time setting unit 240 can set the photographing time by analyzing a plurality of moving objects. Undesired objects may be removed by removing the largest and slowest object first and reducing a photographing interval for the next largest and slowest object. Shooting time setting unit 240 may delete the next largest and slowest undesired object may by finding the next unwanted object with the second greatest value and calculating the maximum photographing frames per second by dividing the next object size by its motion vector size. Shooting time setting unit 240 may continue doing the same with a third unwanted object with the third greatest value and so forth. The maximum photographing interval may be identified for each object and the photographing time may be set such that a photographing time is minimized and a plurality of undesired objects can be deleted.

In another example, shooting time setting unit 240 may estimate a photographing interval for removing a selected object. This method may include identifying objects unwanted by a user. The analyzer 230 obtains motion vectors for each unwanted object. The shooting time setting unit 240 obtains the object size as the object moves toward a direction by using the motion vector, and calculates the maximum photographing frames per second by dividing the object size by the motion vector.

If the photographing time and photographing interval are set, the control unit 100 may obtain frames in accordance with the set photographing interval. The image processing unit 210 may process the frames and store them in buffer 220. Here, the control unit 100 may process the frames by controlling the image processing unit 210 with the set photographing interval while continuously photographing in the eraser photographing mode. The frames processed by the image processing unit 210 may be full resolution images of the camera 120.

Figure 4A:
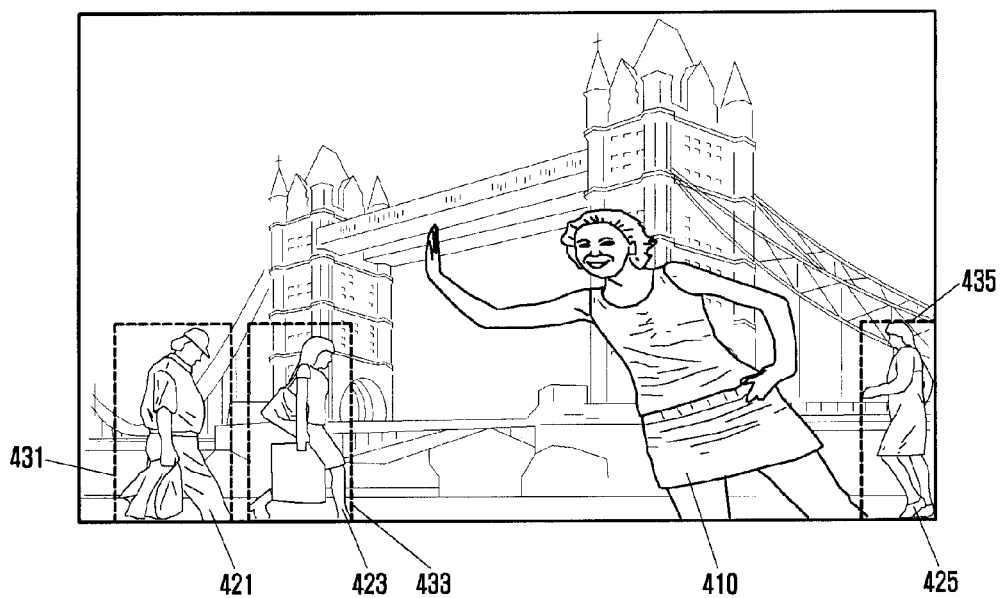
FIG. 4A, FIG. 4B, FIG. 4C and FIG. 4D are working examples of deleting a moving object from a photographed image in accordance with aspects of the present disclosure.
Figure 4B:
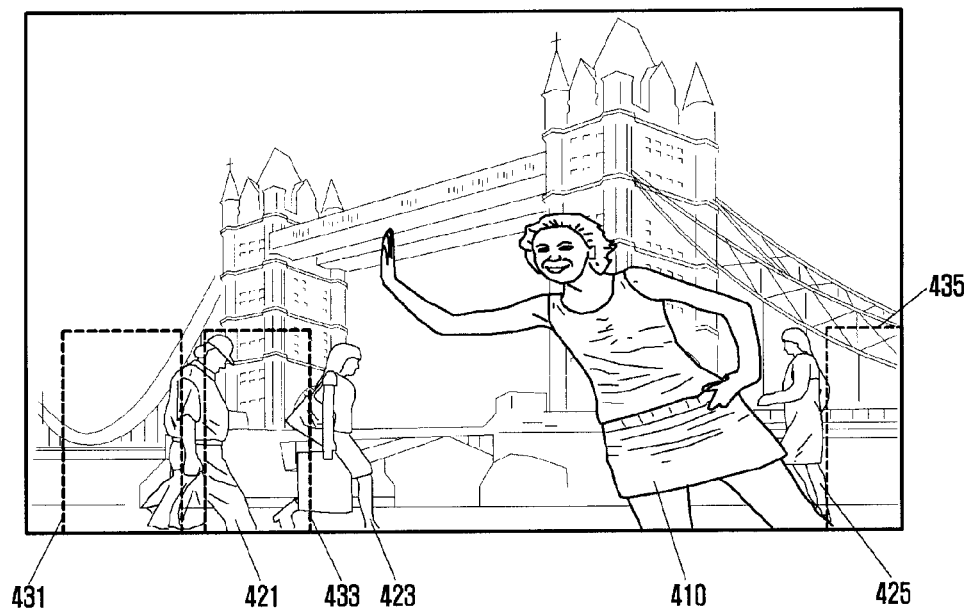
Figure 4C:
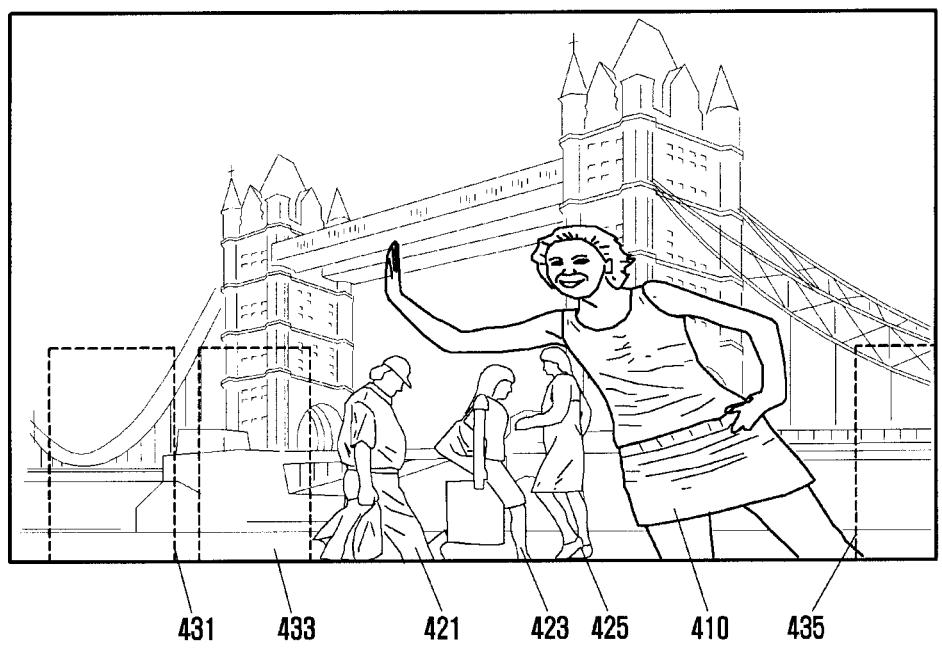

FIGS. 4A to 4C illustrates working examples of frames continuously processed by the image processing unit 210 in the eraser photographing mode. In FIGS. 4A-4C, person 410 is a desired object and objects 421, 423 and 425 are undesired moving objects. By way of example, a photographer may intend to photograph person 410 with an unobstructed background and undesired objects 421, 423, and 425 are obstructing certain background images in the photograph. In this instance, the user may select the eraser photographing mode.

Figure 4D:
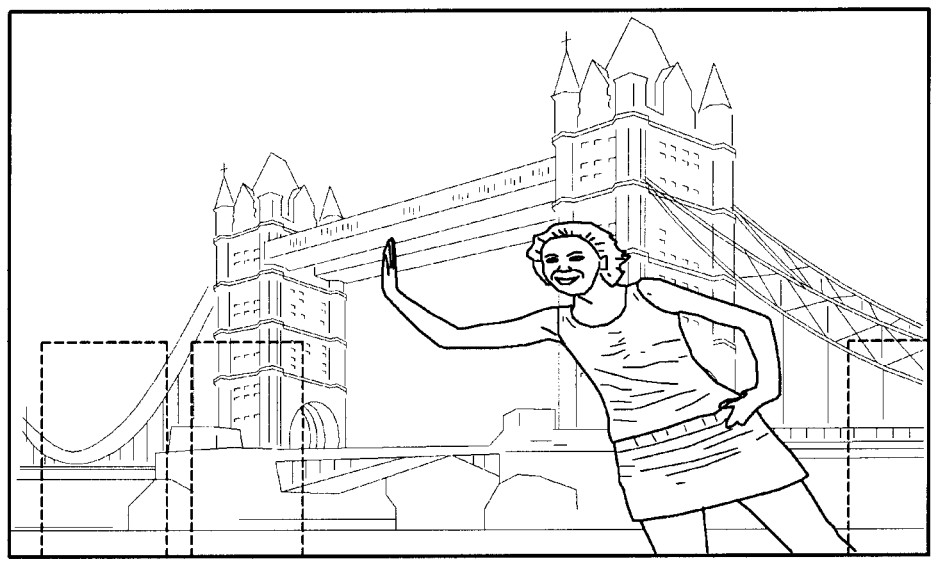

If the eraser photographing mode is selected, the analyzer 230 and the shooting time setting unit 240 may identify motion vectors of moving objects 421, 423, and 425 in preview frames. Analyzer 230 and shooting time setting unit 240 may determine a photographing time and photographing interval that enables removal of the undesired objects so as to restore a background image by analyzing the speed of the motion vector and/or the object size. For example, when removing an object 421 from the image of FIG. 4A, a frame may be captured such that object 421 is removed from area 431. Here, area 431 may include the moving object 421 and a still object (for example, portion of bridge) may also be in the background. In this instance, the image of area 431 may be restored with a still background image after removing moving object 421. FIG. 4B illustrates that moving objects 421, 423, and 425 are partially displayed in areas 431, 433, and 435 respectively. In this instance, moving objects 421, 423, and 425 cannot be completely removed because areas 431, 433, and 435 still contain portions of the moving objects. Therefore, the shooting time setting unit 240 may set the photographing time and interval so that moving objects 421, 423, and 425 are not present in their respective areas. Namely, the shooting time setting unit 240 may set the photographing time and interval so that the background images are completely visible after removing the frames with the unwanted objects, as shown in FIG. 4D.

If the photographing interval is set, the control unit 100 controls the camera 120 (or image processing unit 210) to obtain frames in accordance with the set photographing time and interval. Referring back to the working example in FIG. 4A, an image intended to be photographed includes object 410 and a background, and objects 421, 423 and 425 are undesired objects. In this instance, control unit 100 removes objects 421, 423, and 425 and replaces the objects with their respective backgrounds in areas 431, 433, and 435.

By way of further example, if frames shown in FIGS. 4A to 4C are obtained in the eraser photographing mode, the buffer 220 temporarily stores the obtained frames. The image synthesizer 250 removes frames containing the objects 421, 423, and 425, as shown in FIGS. 4A to 4C, and generates a final desired image by replacing the unwanted objects with a background image. In this example, the image synthesizer 250 selects a specific image without the unwanted objects (for example, a good image having no blur), removes the frames with unwanted moving objects from the image, and generates a final image by synthesizing images having a background image at the location of the removed object. For example, image synthesizer 250 may remove the frames with the unwanted moving objects 421, 423, and 425 from the image of FIG. 4A, and may generate a final image by synthesizing the background images in areas 431, 433, and 435, as shown in FIG. 4C. In this instance, the final image generated by the image synthesizer 250 may look like the image shown in FIG. 4D.

Referring now to FIG. 5, a flow chart of an example eraser photographing method is shown. When a user requests to photograph an image using camera 120, control unit 100 detects the user request at operation 511 and enters a preview mode to process frames detected by the camera 120 at operation 513. In this instance, the image processing unit 210 processes the frames detected by camera 120 and displays them on display unit 130. This may allow a user to photograph a desired image in the preview mode. If no user request is detected at 511, a corresponding function may be performed at operation 541. If a moving object is included in the image about to be photographed by camera 120, the user may enter the eraser photographing mode. When the user do not select the eraser photographing mode through input unit 140, the control unit 100 may detect the user selection at operation 515. Control unit 100 may perform corresponding camera mode at operation 527.

When the user selects the eraser photographing mode through input unit 140, the control unit 100 may detect the user selection at operation 515. Control unit 100 may identify motion vectors of moving objects in the preview frames detected by camera 120 and may set a photographing interval by based on the motion vectors at operation 517. It is understood that setting the photographing interval in accordance with the movement of objects may be performed in a variety of ways. After setting the photographing interval, control unit 100 buffers frames obtained with the set photographing interval at operation 519. The frames may be continuously photographed from the camera 120 with the set time interval. Control unit 100 may remove frames with the unwanted objects from the buffered frames and may generate an edited frame by synthesizing the frames with the background image located at the area from which the unwanted object was removed, at operation 521.

After removing the objects, control unit 100 displays the desired image in the display unit 130 and stores the generated image in the storage unit 110 at operation 523 of FIG. 5. In this example, the continuously photographed frames may be deleted or stored with the final image in storage unit 110. The eraser photographing mode may be performed until a user request for photograph termination is detected. Control unit 100 may terminate photographing at operation 525 in response to the user request.

Figure 6:
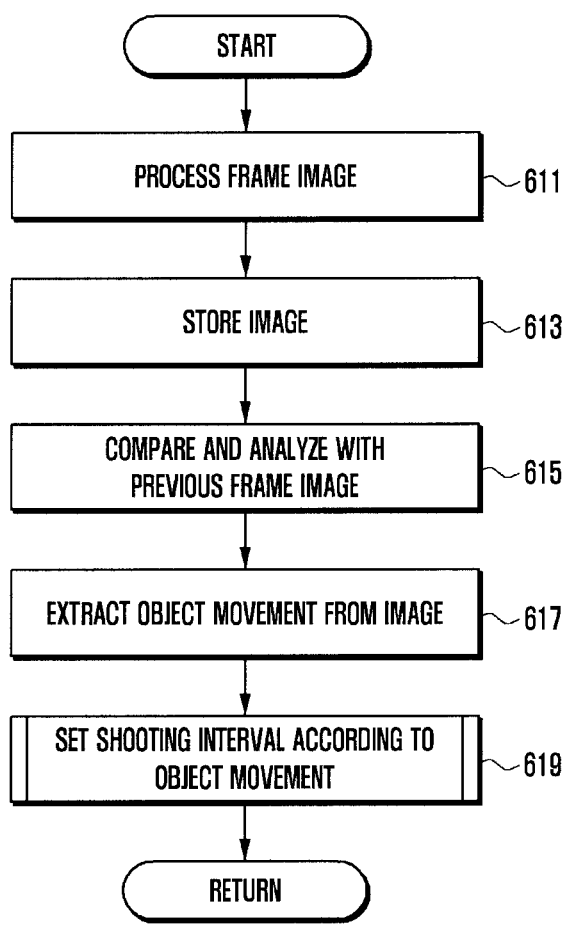
FIG. 6 is a flow chart illustrating an example method for identifying vectors of unwanted object movements in accordance with aspects of the present disclosure.

Referring now to FIG. 6 a flow chart illustrating an example method for identifying vectors of object movements is shown. Control unit 100 processes (e.g., pre-processing and post-processing) a frame detected by camera 120 at operation 611 and buffers the processed frames at operation 613. Control unit 100 may compare a previously buffered frame with the next frame (e.g., a frame currently being processed) at operation 615, and may identify motion vectors of objects in the image based on the analysis result at operation 617. In one example, the control unit 100 may identify a moving pixel by comparing and analyzing sequential frames in the preview mode. Brightness values of each pixel may be compared between sequential frames and control unit 100 may identify pixels that are moving, when the brightness differences between frames are greater than a predetermined value. Control unit 100 may compare sequential frames that are continuously detected by camera 120 and may identify pixels having a similar difference between a pair of sequential frames. Control unit 100 may identify a motion vector based on the pixels having a similar difference in brightness. When the motion vector connects similar pixels or pixels that are close to each other within a distance threshold between sequential frames, control unit 100 may consider the corresponding pixels as being the same pixel, and identifies the corresponding vectors as a motion vector of object.

After calculating the motion vector, the control unit 100 may set a photographing interval for removing an unwanted moving object included in the image by using the identified motion vectors, at operation 619. Here, the photographing interval may be set by comparing the sizes and movements of the vectors or by predicting the speed of moving object.

Figure 7:
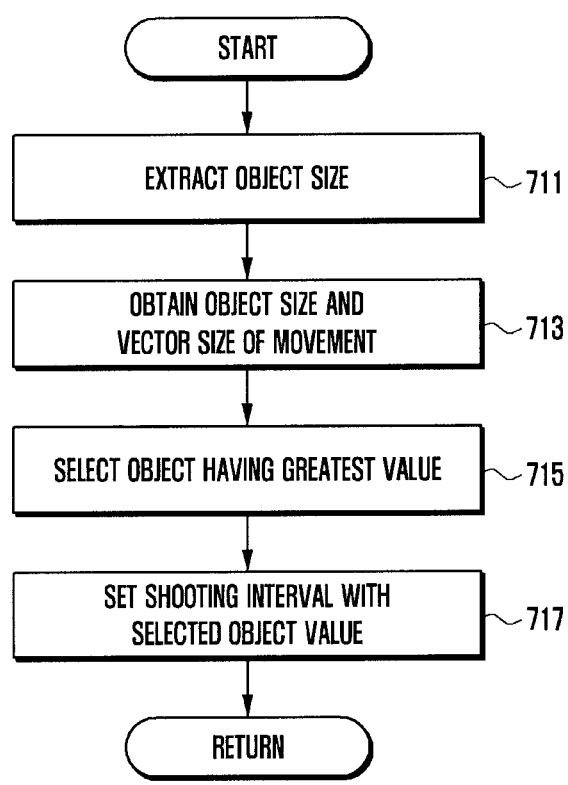
FIG. 7 is a flow chart illustrating an example method for setting a photographing interval in accordance with aspects of the present disclosure.

Referring now to FIG. 7, a flow chart illustrating an example method for setting a photographing interval is shown. Control unit 100 may identify a size of each moving object at operation 711. Control unit 100 may divide the object size by the moving vector size at operation 713 and may select the object with the highest result, the slowest object, or the slowest object with the highest result at operation 715, and set a photographing interval (e.g., the maximum photographing frames per second) based on the result of the objects at operation 717.

Figure 8:
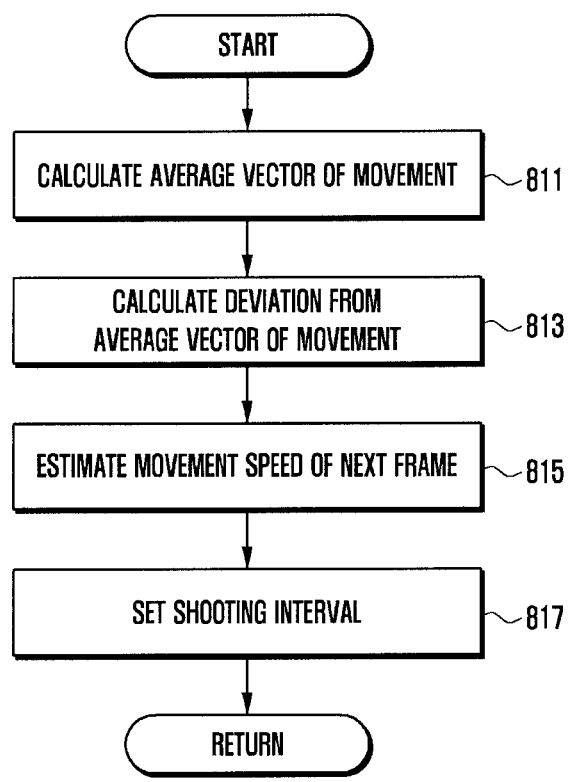
FIG. 8 is a flow chart illustrating a further example method for setting a photographing interval in accordance with aspects of the present disclosure.

Referring now to FIG. 8, a flow chart illustrating another example method for setting a photographing interval is shown. Control unit 100 may average the motion vectors of moving objects in a predetermined number of frames detected in the preview mode, at operation 811. The number of frames may be set to, for example, 3 to 5 frames. The control unit 100 calculates an increase or decrease in the motion vector by identifying the difference between a motion vector of a current frame and the average motion vector value, at operation 813. This difference may be calculated for specific frames. Control unit 100 may estimate an increase or decrease of speed in accordance with the difference from the average value and may estimate the movement speed of object in a following frame, at operation 815. In one example, the estimation of the speed of the moving object can be performed by using a Kalman filter. Control unit 100 may consider the estimated movement speed as the motion vector and may calculate the maximum photographing frames per second at operation 817 by dividing the object size by the vector size.

While performing the example methods of FIGS. 5 to 8, the photographing interval calculated while in the eraser photographing mode may be based at least partially on the motion vector. In one example, a plurality of objects may be included in the frame. In this instance, the photographing interval may be set by analyzing the movement of the largest and slowest object. The photographing interval can be set differently for each object in accordance with the movement thereof.

Setting the photographing interval for a plurality objects may be performed in the following method. Control unit 100 may delete the largest and slowest object first and decrease the photographing interval for the next largest and slowest object. When the trace of the slowest object overlaps with another object, control unit 100 may delete the other object. However, if the trace of the slowest object does not overlap another object, the control unit 100 may identify the second highest value resulting from dividing each object size by its motion vector size. This second highest value may be set as the maximum photographing frames per second for the next photographing frame. The same may be done for the third largest value and so on. Thus, the photographing interval for each unwanted object may be determined such that control unit 100 may delete a plurality of undesired objects as well as minimize the photographing time.

In another example, the photographing interval may be set by analyzing a movement of an object selected by a user. The images of FIGS. 4A to 4C includes three moving objects 421, 423, and 425 and the user may set the photographing interval by selecting one of these moving objects. That is, the user may identify the movement speed and size of an object displayed in the display unit 130, and may select the greatest and slowest object in the eraser photographing mode. In this instance, the control unit 100 identifies the object selected by the user, obtains the object size, and calculates the maximum photographing frames per second by dividing the object size by the motion vector.

Figure 9:
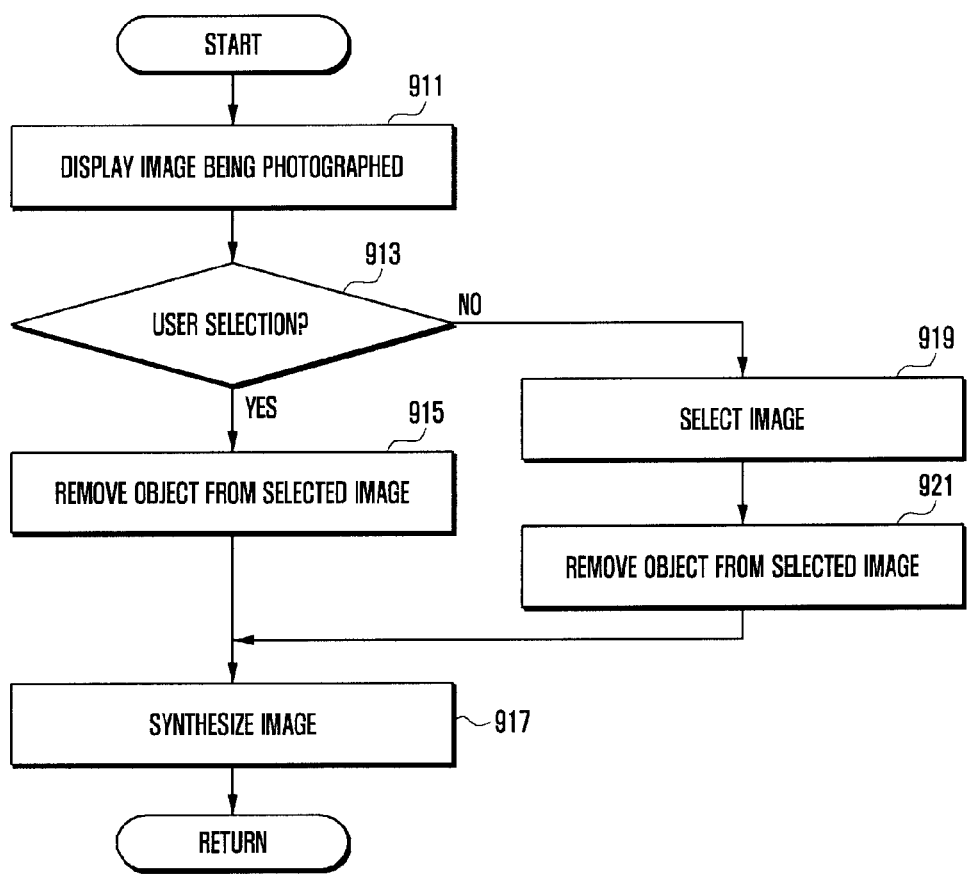
FIG. 9 is a flow chart illustrating an example method for generating an image by removing an unwanted object therefrom in accordance with aspects of the present disclosure.

Referring now to FIG. 9, a flow chart illustrating an example method for generating a final image with unwanted objects removed is shown. Control unit 100 may temporarily store images photographed with the set photographing interval and display the images in the display unit 130 at operation 911. The control unit 100 generates an image with removed objects by removing the unwanted objects and synthesizing a background image in place of each unwanted object, when photographing is completed. Here, the object to be removed can be selected by the user or the control unit 100.

If the user doesn't select an unwanted image, the control unit 100 detects an unwanted image at operation 913 and selects the image to be removed at operation 919. Here, the selected image may be an image having a moving object among the plurality of frames that are continuously photographed (i.e., an object out of the photographing area). Furthermore, the control unit 100 may select the first frame or the last frame from the continuously photographed frames. After selecting an image, the control unit 100 may remove the moving object in the selected frame at operation 921. Control unit 100 may synthesize a plurality of frames by selecting a frame having a back ground image at the location of the removed object at operation 917. In this instance, the image with removed objects may be generated as shown in FIG. 4D.

If the user selects an image, the control unit 100 detects it at operation 913, and removes moving objects from the selected image at operation 915. Control unit 100 may select a frame having a background image at the location of the removed object and synthesizes the frames at operation 917.

Figure 10:
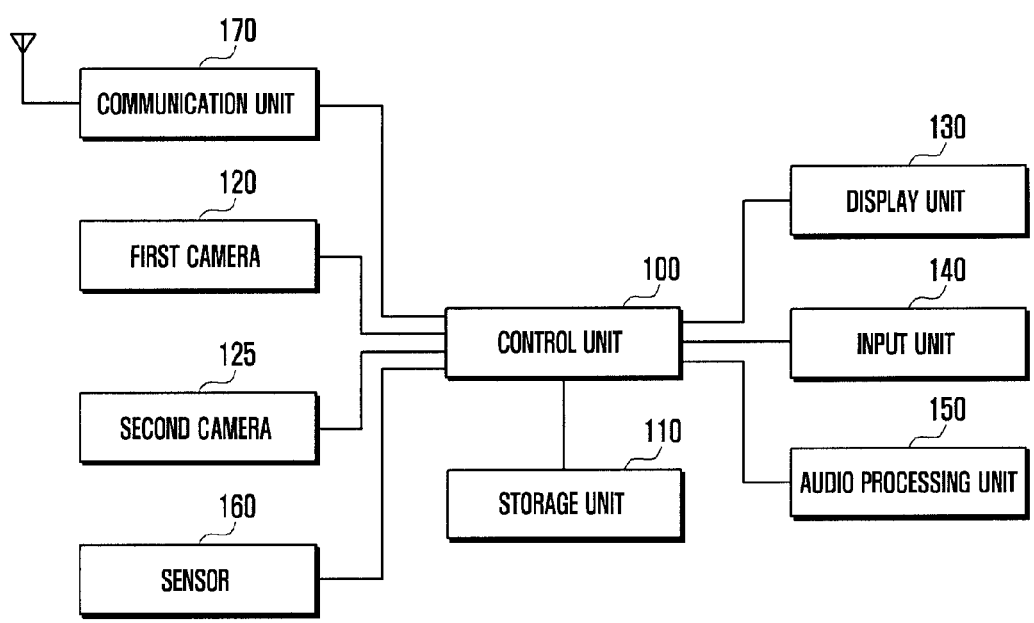
FIG. 10 is a block diagram illustrating a configuration of an example camera device for eraser photographing in accordance with aspects of the present disclosure.

FIG. 10 is a block diagram illustrating a configuration of an example camera device for removing unwanted objects in accordance with aspects of the present disclosure. Here, the electronic device may include various digital equipment having a camera, such as a mobile phone including a smart phone, MP3 terminal, tablet, computer, and camera device.

Referring to FIG. 10, a communication unit 170 performs a wireless communication function with a base station or an internet server. Here, the communication unit 170 may be configured with a transmitter for up-converting and amplifying the frequency of a transmitting signal, and a receiver for down-converting and low-noise amplifying the frequency of a received signal. Furthermore, the communication unit 170 may include a modulator and a demodulator. The modulator transmits a signal to the transmitter by modulating the signal and the demodulator demodulates the signal received through the receiver. Here, the modem (modulator and demodulator) may be an LTE, WCDMA, GSM, WIFI, WIBRO, NFC, or Bluetooth. In the examples of the present disclosure, the communication unit 170 is assumed to be configured with an LTE, WIFI, and Bluetooth communication units.

A first camera 120 is installed at the rear side of a terminal device and photographs a high resolution image. A second camera 125 is installed at the front side of the terminal device and photographs a relatively low resolution image than the first camera 120.

A control unit 100 controls general operations of the portable terminal and can perform an eraser photographing mode. The control unit 100 sets a photographing interval in accordance with object characteristics of an image by comparing and analyzing frames continuously obtained in a preview mode and previous frames in the eraser photographing mode, continuously photographs images with the set photographing interval, and generates an image by removing undesired objects from the continuously photographed images and synthesizing an area of removed object with a corresponding background image.

A storage unit 110 may be configured with a program memory for storing an operating program of the terminal and programs in accordance with aspects of the present disclosure, and a data memory for storing tables for the operation of the terminal and data generated while executing a program. Furthermore, the storage unit 110 temporarily stores images obtained in the eraser photographing mode, and stores finally edited image by an image synthesis.

A display unit 130 displays application information under the control of the control unit 100. The display unit 130 displays buttons for executing the eraser photographing mode and continuously being photographed images. The display unit 130 may be an LCD or an OLED. An input unit 140 may be formed in a capacitive type or a resistive type, and outputs location information of a user' touch (hereafter, a finger touch is assumed) to the control unit 100. Furthermore, the input unit 140 may include an EMR sensor pad, and detects a pen touch input to output to the control unit 100. Here, the display unit 130 and the input unit 140 may be configured in an integral form.

An audio processing unit 150 processes a voice signal generated in a communication mode under the control of the control unit 100, and outputs operation sounds of the cameras 120 and 125 in a photographing mode under the control of the control unit 100. A sensor 160 includes sensors for detecting the movement of the portable terminal, such as an acceleration sensor, geomagnetic sensor, and/or location detecting sensor.

The electronic device having the camera 120 and/or 125 may analyze images photographed in the eraser photographing mode; may set a photographing interval in accordance with unwanted object characteristics; may generate an image by removing undesired objects from images that were continuously photographed with the set photographing interval; and may synthesize the images.

The electronic device may set a photographing interval by analyzing movements of unwanted objects included in an image. The electronic device may classify the movements of objects; may identify motion vectors of the each classified object; and may identify an object size in the direction of a classified object. The electronic device may divide the object size by the vector size for each object; may select the slowest object that results in the greatest value; and may set the resulting value as a photographing interval (maximum photographing frames per second). In another example, the electronic device may photograph images in accordance with the set photographing interval; may generate a desired image by removing unwanted objects from the photographed images; and may synthesize a background image at the location of the removed object.

In a further aspect, the motion vector of a given object may be obtained by identifying pixels having a similar difference in the brightness values between frames. The size and movement of the pixels having the most similarity between frames may be defined as a motion vector. The object size may be calculated by identifying the direction of the motion vector and analyzing the object size in the identified direction.

In another example, the electronic device may set the photographing interval by estimating the movement speed of the unwanted object included in the image. In this instance, the electronic device may identify a motion vector of the unwanted object by analyzing preview images. The electronic device may average the identified motion vectors in a predetermined number of frames. In another example, the electronic device may calculate a difference between the average value and a motion vector identified from a frame, and may consider the difference to be an increment of the motion vector in the next frame. In a further example, a movement speed may be estimated in the next frame by using the increment of motion vector, and a photographing interval may be set in accordance with the estimated movement speed.

If an undesired object is included in an image being photographed, a desired resulting image may be obtained by entering an eraser photographing mode. In one example, the camera device and/or electronic device may automatically set a photographing interval to remove a moving object detected in continuously detected preview images. The preview images may be obtained in accordance with a photographing interval and undesired objects may be automatically removed from the photographed image. The desired image may be generated by synthesizing the area of removed object with a background image. Advantageously, the camera device and/or electronic device disclosed herein may reduce photographing time and may remove unwanted objects by adjusting the photographing interval if necessary.

Although examples of the disclosure have been described in detail, it should be understood that many variations and modifications may be made to the examples without departing from the spirit and scope of the disclosure as defined by the appended claims. The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

In addition, an artisan understands and appreciates that a "processor" or "microprocessor" constitute hardware in the claimed invention. Under the broadest reasonable interpretation, the appended claims constitute statutory subject matter in compliance with 35 U.S.C. §101.

The functions and process steps herein may be performed automatically or wholly or partially in response to user command. An activity (including a step) performed automatically is performed in response to executable instruction or device operation without user direct initiation of the activity.

The terms "unit" or "module" referred to herein is to be understood as comprising hardware such as a processor or microprocessor configured for a certain desired functionality, or a non-transitory medium comprising machine executable code, in accordance with statutory subject matter under 35 U.S.C. §101 and does not constitute software per se.

What is claimed is:

1. A method comprising:
   identifying a motion vector of an unwanted object in preview frames of a desired image obtained by a camera;
   setting a photographing interval in accordance with the motion vector, wherein the motion vector comprises a size of the unwanted object and a speed of the unwanted object;
   photographing continuous frames of the desired image in accordance with the photographing interval; and
   removing the unwanted object from the desired image so as to restore a background behind the unwanted object using the continuous frames and the photographing interval,
   wherein setting the photographing interval comprises:
   identifying the size of the unwanted object as it moves; and
   analyzing the size of the unwanted object and the speed of the unwanted object,
   wherein setting the photographing interval further comprises:
   dividing the size of each unwanted object with the motion vector of each unwanted object; and
   identifying a maximum photographing frames per second based at least partially on a slowest unwanted object having a largest size.

2. The method of claim 1, further comprising displaying the desired image by synthesizing frames of the desired image with the object removed.

3. The method of claim 2, wherein removing the object comprises selecting a plurality of the continuous frames without any blur such that the selected frames render the background in an area from which the object is removed.

4. The method of claim 2, wherein identifying the motion vector comprises:
   identifying pixels having a similar brightness difference between the preview frames; and
   defining a size and direction of the identified pixels as the motion vector.

5. The method of claim 1, wherein setting the photographing interval comprises:
   identifying a size of each unwanted object; and
   analyzing the size and a speed of each unwanted object.

6. A method comprising:
   identifying a motion vector of an unwanted object in preview frames of a desired image obtained by a camera;
   setting a photographing interval in accordance with the motion vector;
   photographing continuous frames of the desired image in accordance with the photographing interval; and
   removing the unwanted object from the desired image so as to restore a background behind the unwanted object using the continuous frames and the photographing interval,
   wherein setting the photographing interval comprises:
   calculating an average motion vector of unwanted objects identified in a predetermined number of frames;
   calculating a difference of a given motion vector detected in a given frame and the average motion vector;
   setting a photographing time and the photographing interval based at least partially on the difference; and
   applying the photographing time and the photographing interval against the continuous frames so as to remove the unwanted object.

7. An apparatus for processing an image in an electronic device, the apparatus comprising:
   a camera;
   a control unit to:
   identify a motion vector of an unwanted object in preview frames of a desired image obtained by the camera;
   set a photographing interval in accordance with the motion vector, wherein the motion vector comprises a size of the unwanted object and a speed of the unwanted object;
   photograph continuous frames of the desired image with the camera in accordance with the photographing interval;
   remove the unwanted object from the desired image so as to restore a background behind the unwanted object with the continuous frames and the photographing interval,
   wherein the control unit to further:
   identify the size of the unwanted object as it moves; and
   analyzing the size of the unwanted object and the speed of the unwanted object to determine a photographing time and the photographing interval applied against the continuous frames so as to remove the unwanted object,
   wherein to set the photographing interval the control unit to further:
   divide the size of each unwanted object with the motion vector of each unwanted object: and
   identify a maximum photographing frames per second based at least partially on a slowest unwanted object having a largest size.

8. The apparatus of claim 7, wherein the control unit comprises:
   an image processing unit to process the preview frames;
   a buffer to buffer the preview frames;
   an analyzer to identify motion vectors of unwanted objects in the preview frames;
   a shooting time setting unit to identify the photographing interval in accordance with the motion vector; and
   an image synthesizer to select a plurality of the continuous frames in the buffer in accordance with the photographing interval so as to replace the unwanted object with the background.

9. The apparatus of claim 8, wherein the control unit to further:
   store the continuous frames in the buffer;
   generate the desired image by synthesizing continuous frames without the unwanted object;
   display the desired image on a display unit; and
   store the desired image in a storage unit.

10. The apparatus of claim 9, wherein the control unit to further select a plurality of the continuous frames without any blur such that the selected frames render the background in an area from which the object is removed.

11. The apparatus of claim 9, wherein the control unit to further:
    identify pixels having a similar brightness difference between the preview frames; and define a size and direction of the identified pixels as the motion vector.

12. The apparatus of claim 7, wherein to set the photographing interval the control unit to further:
identify a size of each unwanted object; and
analyze the size and a speed of each unwanted object.

13. An apparatus for processing an image in an electronic device, the apparatus comprising:
a camera;
a control unit to:
identify a motion vector of an unwanted object in preview frames of a desired image obtained by the camera;
set a photographing interval in accordance with the motion vector;
photograph continuous frames of the desired image with the camera in accordance with the photographing interval;
remove the unwanted object from the desired image so as to restore a background behind the unwanted object with the continuous frames and the photographing interval
wherein to set the photographing interval the control unit to further:
calculate an average motion vector of unwanted objects identified in a predetermined number of frames;
calculate a difference of a given motion vector detected in a given frame and the average motion vector; and
set a photographing time and the photographing interval based at least partially on the difference.

* * * * *